United States Patent
Spector

(10) Patent No.: US 7,870,229 B2
(45) Date of Patent: *Jan. 11, 2011

(54) NETWORK FOR TARGETING INDIVIDUAL OPERATING A MICROCOMPUTER REGARDLESS OF HIS LOCATION

(75) Inventor: Donald Spector, Union City, NJ (US)

(73) Assignee: Innovation Fund III LLC, Scarsdale, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/470,700

(22) Filed: May 22, 2009

(65) Prior Publication Data

US 2009/0228347 A1    Sep. 10, 2009

Related U.S. Application Data

(63) Continuation of application No. 11/199,433, filed on Aug. 8, 2005, now Pat. No. 7,539,742, which is a continuation-in-part of application No. 09/384,154, filed on Aug. 27, 1999, now Pat. No. 6,970,922.

(51) Int. Cl.
   *G06F 15/16* (2006.01)
(52) U.S. Cl. ............... 709/219; 705/14.1; 455/456.1
(58) Field of Classification Search ........... 709/223, 709/217, 218, 229, 219; 705/14.55, 14.5, 705/14.1; 455/422.1, 456.1; 715/205
   See application file for complete search history.

(56) References Cited

U.S. PATENT DOCUMENTS

| | | | | |
|---|---|---|---|---|
| 5,649,300 A | | 7/1997 | Snyder et al. | 455/517 |
| 5,754,933 A | | 5/1998 | Orndorff | 399/366 |
| 5,809,415 A | * | 9/1998 | Rossmann | 455/422.1 |
| 5,852,775 A | | 12/1998 | Hidary | 455/404 |
| 5,948,061 A | | 9/1999 | Merriman et al. | 709/219 |
| 5,959,577 A | | 9/1999 | Fan et al. | 342/357.13 |
| 5,991,735 A | | 11/1999 | Gerace | 705/10 |
| 6,014,090 A | | 1/2000 | Rosen et al. | 340/905 |
| 6,018,657 A | | 1/2000 | Kennedy, III et al. | 455/426 |
| 6,018,724 A | | 1/2000 | Arent | 705/44 |
| 6,055,504 A | | 4/2000 | Chou et al. | 705/1 |
| 6,055,513 A | | 4/2000 | Katz et al. | 705/26 |
| 6,055,573 A | | 4/2000 | Gardenswartz et al. | 709/224 |
| 6,101,486 A | | 8/2000 | Roberts et al. | 705/27 |
| 6,115,754 A | | 9/2000 | Landgren | 709/249 |
| 6,199,045 B1 | | 3/2001 | Giniger et al. | 705/1 |

(Continued)

*Primary Examiner*—Jungwon Chang
(74) *Attorney, Agent, or Firm*—Sunstein Kann Murphy & Timbers LLP

(57) ABSTRACT

A network adapted to target an individual operating a microcomputer that is linked to an Internet to offer this individual goods or services appropriate to his needs that are available at a place within reach of the individual's present location. The microcomputer is provided with a GPS receiver that indicates the present location of the individual, this location and the identity of the individual being transmitted from the microcomputer to a web site on the highway. At the web site, a computer associated with a data bank storing the profiles of a multitude of consumers is programmed to find out whether the identified individual is included in the data bank, and to determine from his profile whether there are available at a place reachable from his present location appropriate goods or services. If a match is found, an offer to supply such goods or services is conveyed from the web site to the microcomputer.

20 Claims, 3 Drawing Sheets

U.S. PATENT DOCUMENTS

| | | | |
|---|---|---|---|
| 6,208,866 B1 | 3/2001 | Rouhollahzadch et al. | 455/456 |
| 6,324,650 B1 | 11/2001 | Ogilvie | 713/202 |
| 6,332,127 B1 * | 12/2001 | Bandera et al. | 705/14.55 |
| 6,370,514 B1 | 4/2002 | Messner | 705/14 |
| 6,381,465 B1 | 4/2002 | Chern et al. | 455/466 |
| 6,405,126 B1 | 6/2002 | Palomo et al. | 701/202 |
| 6,505,046 B1 | 1/2003 | Baker | 455/456 |
| 6,505,168 B1 | 1/2003 | Rothman et al. | 705/10 |
| 6,510,418 B1 | 1/2003 | Case et al. | 705/26 |
| 6,523,064 B1 * | 2/2003 | Akatsu et al. | 709/226 |
| 6,552,682 B1 | 4/2003 | Fan | 342/357.09 |
| 6,571,279 B1 * | 5/2003 | Herz et al. | 709/217 |
| 6,581,099 B1 * | 6/2003 | Deen et al. | 709/229 |
| 6,608,556 B2 | 8/2003 | De Moerloose et al. | 340/501 |
| 6,636,733 B1 | 10/2003 | Helferich | 455/412 |
| 6,647,257 B2 | 11/2003 | Owensby | 455/414.1 |
| 6,664,922 B1 | 12/2003 | Fan | 342/357.1 |
| 6,668,353 B1 * | 12/2003 | Yurkovic | 715/205 |
| 6,677,894 B2 | 1/2004 | Sheynblat et al. | 342/357.1 |
| 6,754,485 B1 | 6/2004 | Obradovich et al. | 455/414.1 |
| 6,826,554 B2 | 11/2004 | Sone | 707/2 |
| 6,868,392 B1 | 3/2005 | Ogasawara | 705/26 |
| 6,889,054 B2 | 5/2005 | Himmel et al. | 455/456.3 |
| 6,912,398 B1 | 6/2005 | Domnitz | 455/461 |
| 6,922,672 B1 * | 7/2005 | Hailpern et al. | 705/14.5 |
| 6,993,570 B1 * | 1/2006 | Irani | 709/218 |
| 7,020,685 B1 | 3/2006 | Chen et al. | 709/204 |
| 7,093,286 B1 | 8/2006 | King | 726/12 |
| 7,539,742 B2 * | 5/2009 | Spector | 709/223 |
| 2001/0014868 A1 | 8/2001 | Herz et al. | 705/14 |
| 2002/0026368 A1 | 2/2002 | Carter, III | 705/20 |
| 2002/0128903 A1 | 9/2002 | Kernahan | 705/14 |

* cited by examiner

NETWORK FOR TARGETING INDIVIDUAL OPERATING A MICROCOMPUTER REGARDLESS OF HIS LOCATION

CROSS-REFERENCE TO RELATED APPLICATIONS

This application is a continuation of U.S. patent application Ser. No. 11/199,433, filed on Aug. 8, 2005, now U.S. Pat. No. 7,539,742, which in turn is a continuation-in-part of U.S. patent application Ser. No. 09/384,154, filed Aug. 27, 1999, now U.S. Pat. No. 6,970,922. Both of these applications are incorporated herein by reference.

BACKGROUND OF THE INVENTION

This invention relates generally to a network in which a microcomputer is microwave linked to an Internet highway, and more particularly to a network of this type adapted to target the individual operating the microcomputer in order to offer to supply him with goods or services that are available at a place within range of the individual's present location.

The Internet is a world-wide information highway interlinking millions of computer terminals, each having many users. Associated with Internet are various commercially-operated on-line services, such as Prodigy, CompuServe and Online. One important use to which internet is put is the retrieval of information from electronic libraries and other data bases, thereby giving each terminal access to a vast treasury of information.

The term lap-top computer originally referred to a microcomputer small enough to be used on a person's lap. But this term is currently applicable to any self sufficient, portable computer that can be carried to any desired site and operated at that site.

It is now known to microwave-link a lap-top computer to an Internet highway in a manner similar to that by which a cellular radiotelephone is coupled to a telephone system. When, therefore, a lap-top computer is linked by a microwave transceiver to an Internet highway it then has access to the same data bases that are accessible to standard computer terminals that are effectively wired into this highway.

In a network in accordance with the invention, a laptop or portable computer that is microwave-linked to an Internet highway is provided with a GPS receiver that determines the exact present location of the individual operating the microcomputer. Thus if the individual is operating the microcomputer at Niagara Falls in Buffalo, N.Y., or at the corner of 5th Avenue and 42nd Street, in New York City, the GPS receiver will so indicate.

GPS refers to a global positioning system formed by a constellation of 24 satellites which orbit the Earth twice a day and continuously broadcast high-frequency radio signals. These signals contain position and time data enabling a GPS ground receiver to determine the location of the receiver anywhere on Earth.

Each point on Earth can be identified by a specific address which represents the exact spot where a horizontal line (latitude) intersects a vertical line (longitude). The basis for GPS technology is precise timing and position information, each satellite broadcasting its time and particular position.

Data bases are now available that have been developed and are maintained by market research agencies. These bases contain the profiles of a multitude of consumers for various types of goods and services. Each profile usually affords a dossier of the individual, giving his age, marital status, credit rating, preferences in food, music and art, taste in clothing and whatever other information is gained in the course of market research.

Thus by scanning a data base containing the profiles of consumers in a certain age bracket living in a given region, one can extract from this data base those consumers in that region who are potential customers for, say an expensive high-fidelity radio, or for a medium-priced automobile. Armed with this information, an advertiser can focus his mailings to those individuals who are the most likely prospects for the advertised products or services.

SUMMARY OF INVENTION

In view of the foregoing, the main object of this invention is to provide a network adapted to target an individual operating a lap-top computer that is microwave-linked to an Internet highway.

More particularly, the object of this invention is to provide a network of the above type that serves to offer the targeted individual goods or services that are appropriate to his needs and are available at a place within easy reach of his present location.

Also an object of this invention is to provide a lap-top computer with a radio transceiver to microwave-link the computer to an Internet highway, and with a GPS receiver to indicate the present location of the individual operating the computer, whereby the location of the individual to be targeted and his identity can be transmitted to a web site on the highway.

Briefly stated, these objects are attained by a network adapted to target an individual operating a microcomputer that is microwave-linked to an Internet highway to offer this individual goods or services appropriate to his needs available at a place within range of the individual's present location. The microcomputer is provided with a GPS receiver that indicates the present location of the individual, this location and the identity of the individual being transmitted from the microcomputer to a web site on the highway.

At the web site, a computer associated with a data bank storing the profiles of a multitude of consumers is programmed to find out whether the identified individual is included in the data bank, and to determine from his profile whether there are available at a place reachable from his present location appropriate goods or services. If a match is found, an offer to supply such goods or services is conveyed from the web site to the microcomputer. In accordance with another aspect of the present invention, the profiles can be stored in a computer integration center instead of a full web site.

BRIEF DESCRIPTION OF DRAWINGS

For a better understanding of the invention as well as other objects and further features thereof, reference is made to the following detailed description to be read in conjunction with the accompanying drawings.

DESCRIPTION OF INVENTION

Figure 1:
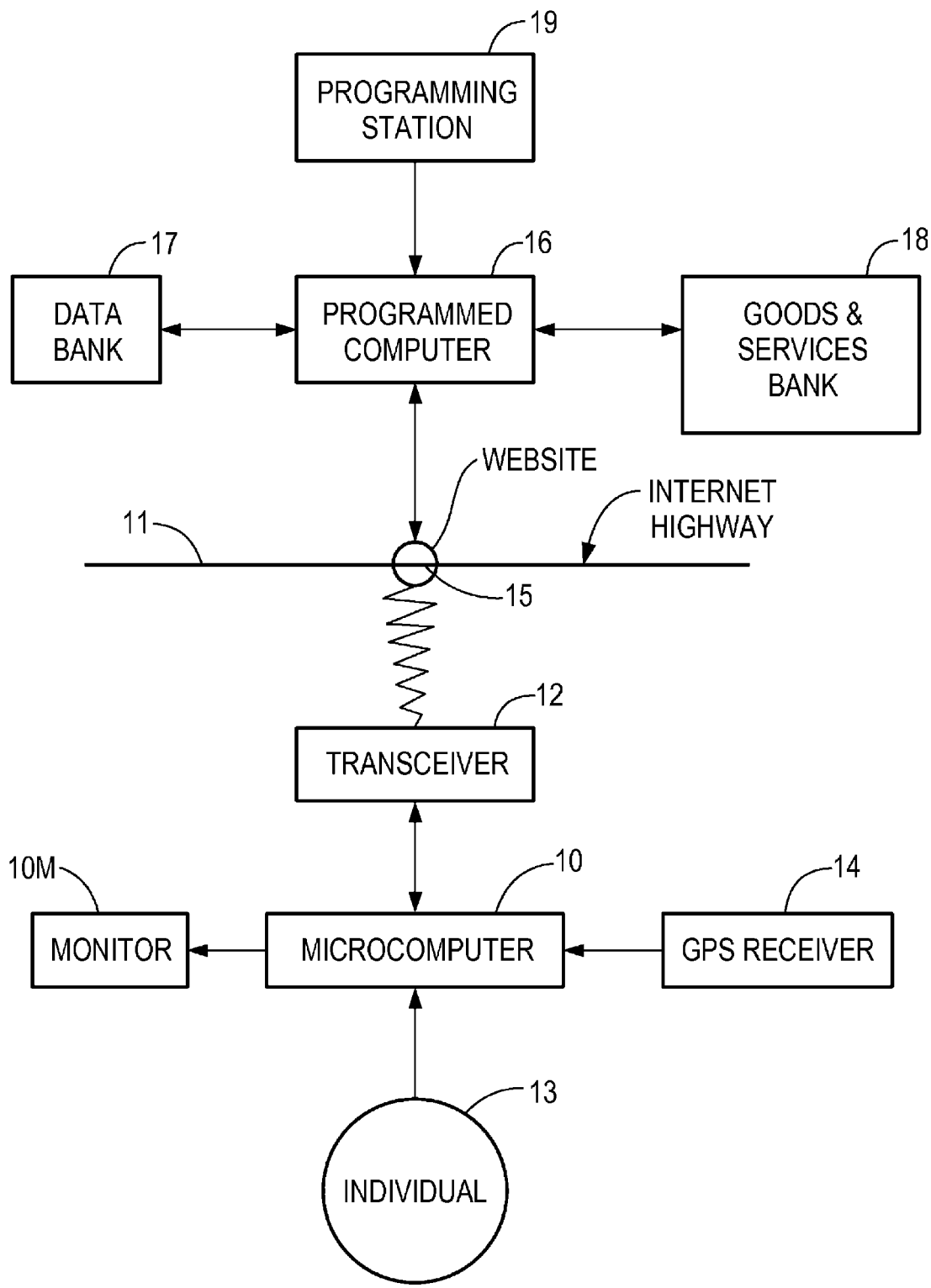
FIG. 1 illustrates in block diagram form a network in accordance with one aspect of the invention.

Referring now to the drawing illustrating a network in accordance with the invention, included in this network is a lap-top computer or other self-sufficient, portable microcomputer 10 provided with a visual monitor 10M having a screen. The computer may be operated by an individual 13 at whatever site to which he takes the computer, such as at an office, at a hotel or motel room or at a public park. But wherever the individual happens to be, the network is informed of his whereabouts. Further, the computer need not be in the possession of an individual. By way of example only, the data can be provided by an individual's phone number and GPS information from the individual's cell phone.

Lap-top computer 10 is microwave-linked to an Internet highway 11 by a radio-transceiver 12 so that the computer and the highway can communicate with each other. Thus lap-top computer 10 which is provided with an E-mail address has access to the same services and sources of information provided by Internet to a standard computer terminal. Thus if the individual is named John Smith, his E-mail address might be WWW.JOHNSMITH.COM. But this Email address is a true address, for it shows not only the name of the address but also his location. The E-mail address can be accessed through a cell number instead of directly. Thus, the computer need not be carried by an individual for the system of the present invention to work.

Associated with lap-top computer is a GPS receiver 14 that picks up radio signals providing positional and time information from satellites, the receiver acting to fix the exact location of the individual operating the computer. In practice, the present location of the individual may be shown on the screen of the computer monitor 10M. Thus if computer 10 equipped with a GPS receiver 14 is carried on board a vehicle or a ship, it then becomes a navigational aid, for one is then given with the exact geographic location of the vehicle or ship. Of course, as mentioned previously, the lap-top computer can be any computing device, including lower power computing devices such as a cell phone.

The exact present location of the individual and his identification are conveyed by microwave transceiver 12 to a web site 15 on the Internet highway. Installed at the web site in a programmed computer 16 associated with a data bank 17. Data bank 17 has stored therein the names of millions of consumers and their respective profiles, including such personal data as bank and credit card information, spending habits, personal interests and whatever other information is collected on each individual by market research activity. The present nature of these data banks is such as to in many cases provide a dossier on each listed individual. The web site 15 does not need to be a full web site that permits access to everyone. For example, the web site 15 can be a site on the Internet that provides communications with a variety of portable computing devices. Thus, the site 15 might be a processing site connected to a network. Similarly, the portable computing devices can be any type of communication device, but is preferably portable and has some computing capabilities.

Programmed computer 16 scans the data bank to find and select for analysis the name of the individual 13 operating the lap-top computer. From the profile of the selected individual the computer determines in connection with a data bank 18 of goods and services available at different locations, whether these goods or services are appropriate to this individual and whether they are at a place easily reachable from the present location of the individual. How computer 16 is to be programmed is controlled by a programming station 19.

For example, if the profile indicates that the individual is a middle aged, well-to-do business man and his present location is in midtown New York City, then programmed computer 16 will transmit from web site 15 to microcomputer 10 an invitation to this individual to have lunch at a nearby restaurant at a substantial discount which will be given by presenting the restaurant with a code number. Or the offer may take the form of an invitation to purchase designer clothing at a discount at a nearby boutique.

In the well-known Zagat guide to New York City restaurants, there is included a breakdown of restaurants by districts, such as midtown, upper east side, downtown, etc.

Hence with respect to restaurants there is no difficulty when the present location of an individual operating the computer is within an established district, for the network will then invite the-individual to that restaurant that is compatible with his profile. Thus it would be appropriate to invite a wealthy individual to an expensive five-star French restaurant, not to a Bistro.

Essential to one aspect of the invention is a computer program capable of analyzing an individual's profile to determine which appropriate goods or services are compatible with his consumer habits and his financial ability to pay for these goods or services.

Figure 2:
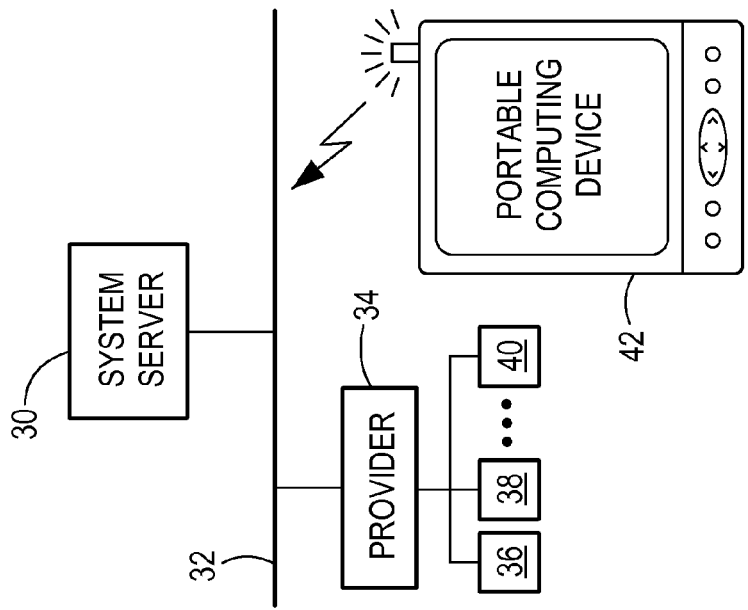
FIG. 2 illustrates a system in accordance with another aspect of the present invention.

In accordance with one aspect of the present invention, offers are made proactively or automatically. The fact that the system of the present invention extends offers to an individual may or may not be visible to the individual. FIG. 2 illustrates a system in accordance with a further aspect of the present invention. The server 30 includes the web site and data banks of user dossiers as well as goods and services available through many providers. The system 30 communicates via the internet 32 or other communication means. The server can be a full web site, but need not be. Instead, it could be an Internet site that provides the necessary communications with a portable computing device 42. A provider 34 can connect to the system 30 through the internet 32 and can update the data banks in the system 30 to indicate goods or services that are available, for example, at a discount. The providers 34 can thereby control sales in a more efficient manner according to supply and demand. So, if sales are slow in a particular time, a provider 34 can update the data banks in the system 30 with offers of discounted goods and services to help drive sales.

The provider 34 can provide access to departments 36, 38 and 40 in the provider's organization. Thus, the departments can provide or receive information relating to the present invention. A portable computing device 42 communicates with the system 30 via any wireless communication technique, although the communication can also be via a wired internet connection. As previously mentioned, the portable computing device need not be a computer such as a laptop. The portable computing device 42 can be a cell phone or a Blackberry. Thus, the device 42 can be a communication device. Further, the device 42 is preferably portable.

In one example, a car is driving down I95 in Florida with a driver from New York, the system could identify a driver and the driver's location, access its data banks 17 and 18 to determine what offers are available and extend an offer for a hotel. Thus, if a Ramada Inn on I95 in Florida had excess capacity for that night, it could update the data banks 17 and 18 to indicate that there were rooms available for a 50% discount, or alternatively, that there are rooms available at a certain price representing a certain percentage discount. The system would then cause that offer to be broadcast so that any portable computing device 10 would receive the offer.

The offer from the hotel could also include a number that the individual receiving the offer could use to accept the offer. In accordance with one aspect of the present invention, that number is provided to the provider 34. When the individual comes to the hotel; the individual would present the number and the provider 34 could verify the number at his terminal.

Of course, the provider 34 can have many terminals that are in communication with the system 30. For example, the provider 34 could be a chain of Ramada Inns with a headquarters that updates the data banks in the system 30 and a local hotel on I95 that receives the verification numbers.

As another example, a sporting arena that is not filled for an event could similarly update the data banks 17 and 18 so that offers for tickets having a reduced price could be offered. As before, the offer could extend a certain price representing a certain percentage discount so that the person using the portable computing device 10 could put the offer into perspective. The offer could also include offers for associated goods, such as a coupon for concessions such as a hot dog and a beer. In this case, the verification number transmitted with the offer would be transmitted to multiple departments in the arena, including the ticketing department and the concessions department for their use.

The applications of the present invention extend to many goods and services. For example, Broadway producers use the term "papering the house" to describe the situation where tickets are deeply discounted to draw an audience so that the act stays inspired and doesn't feel like nobody showed up. On slow nights, the playhouse 34 could access the system 30 to update the data banks to offer discounted tickets.

There are many different types of portable computing devices that may be employed in accordance with the present invention. By way of example only, a portable computing device may be a personal digital assistant (PDA), such as a Palm Pilot or a Windows-based PDA, a Blackberry, a cell phone, a laptop computer, an automobile navigational system and other devices having a GPS capability and a wireless communication capability can also be used. Further, the portable computing devices 50 can communicate with the system via any wireless connection, including for example, Bluetooth and other wireless technologies.

Another example of the use of the present invention is to offer competitive sales offers. For example, a person in a GM showroom can now be identified with his cell phone through geopositioning, and that person can be offered a great deal at Ford, perhaps a deal not being offered to anyone else.

There are many more examples of the application of the inventions. A message therapist could advertise messages for $20.00 as people drive by the therapist's location. A store in a poor location A store in a poor location, whether in a shopping mall or otherwise off the main path could target potential buyers and send them a map on their cell phone to the store's location. The potential customer would then become aware of the store even if the store is not be visible from their particular position. This would help businesses on the second or third floors of a store.

Figure 3:
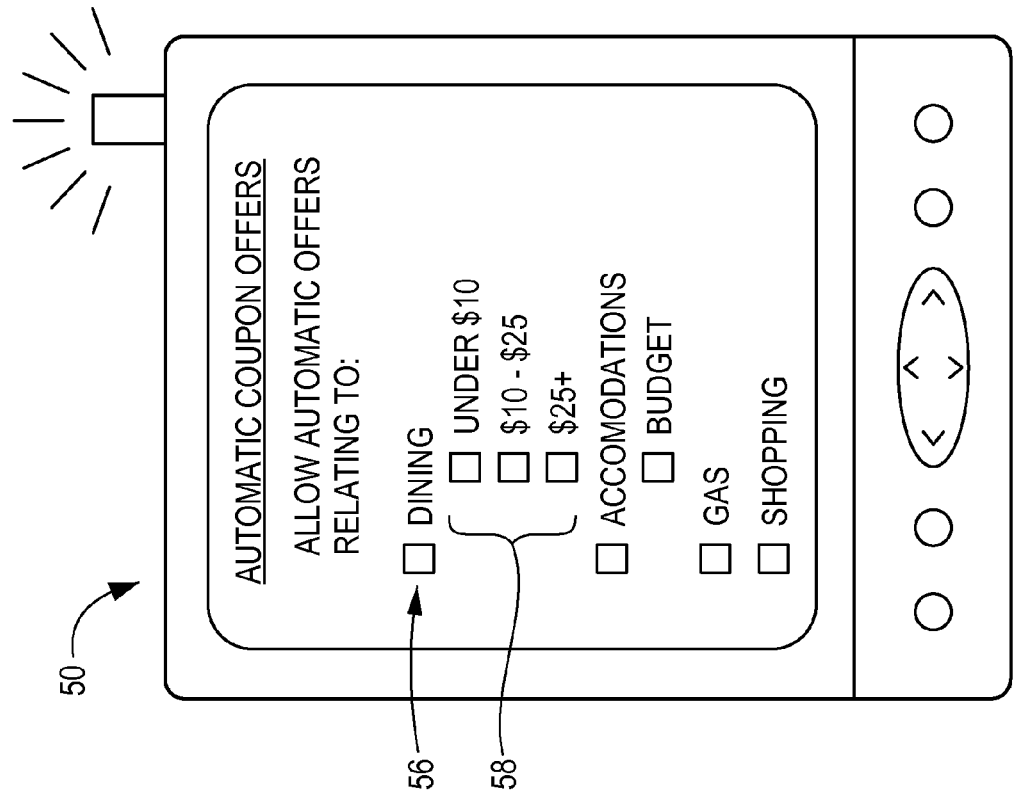
FIG. 3 illustrates a personal computing device, in this case, a personal digital assistant (PDA) operating an interface software module.

FIG. 3 illustrates a portable computing device 50. In accordance with one aspect of the present invention, the portable computing device 50 has a application program that is loaded onto the device. When activated, the application programs displays a plurality of categories and, if desired, sub-categories. Referring to FIG. 3, for example, the category DINING 56 is displayed. Under that category, sub-categories 58 relating to price are also displayed. The sub-categories can be based on any desired categorization of the DINING category. Other categories displayed in FIG. 2 include ACCOMMODATIONS, GAS and SHOPPING. The user of the portable computing device 50 can select one or more of the categories or sub-categories at any time.

The portable computing device 50 has its user's name or other identifying information stored in it. The portable computing device also has a GPS server 16 is receiving the identity and location of the user of the portable computing device 50 through a GPS system located in the portable computing device 50.

Figure 4:
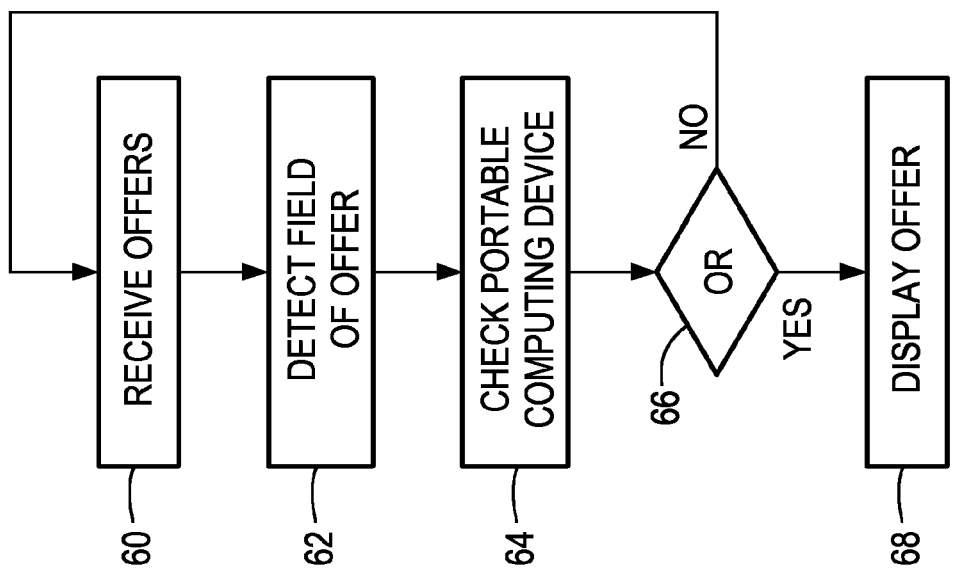
FIG. 4 illustrates the steps performed by the portable computing device in accordance with one aspect of the present invention.

The operation of the portable computing device 50 running the application program is illustrated in FIG. 4. In step 60, the portable computing device 50 receives offers from the system 30 automatically. The message from the system has a field of offer, including categories and sub-categories. The categories and sub-categories correspond to the categories and sub-categories in the application program being run on the portable computing device 50. In step 62, the portable computing device 50 detects the field from the offer.

In step 64, the portable computing device 50 checks the categories and subcategories selected by the user from the application program. In step 66, the portable computing device 50 determines whether the field of the offer automatically received matches any of the fields selected by the individual on the portable computing device 50. If the fields match, then in step 68, the portable computing device displays the offer on its screen. If the fields do not match, then processing starts again.

In accordance with another aspect of the present invention, the service can be provided on a pay basis.

Figure 5:
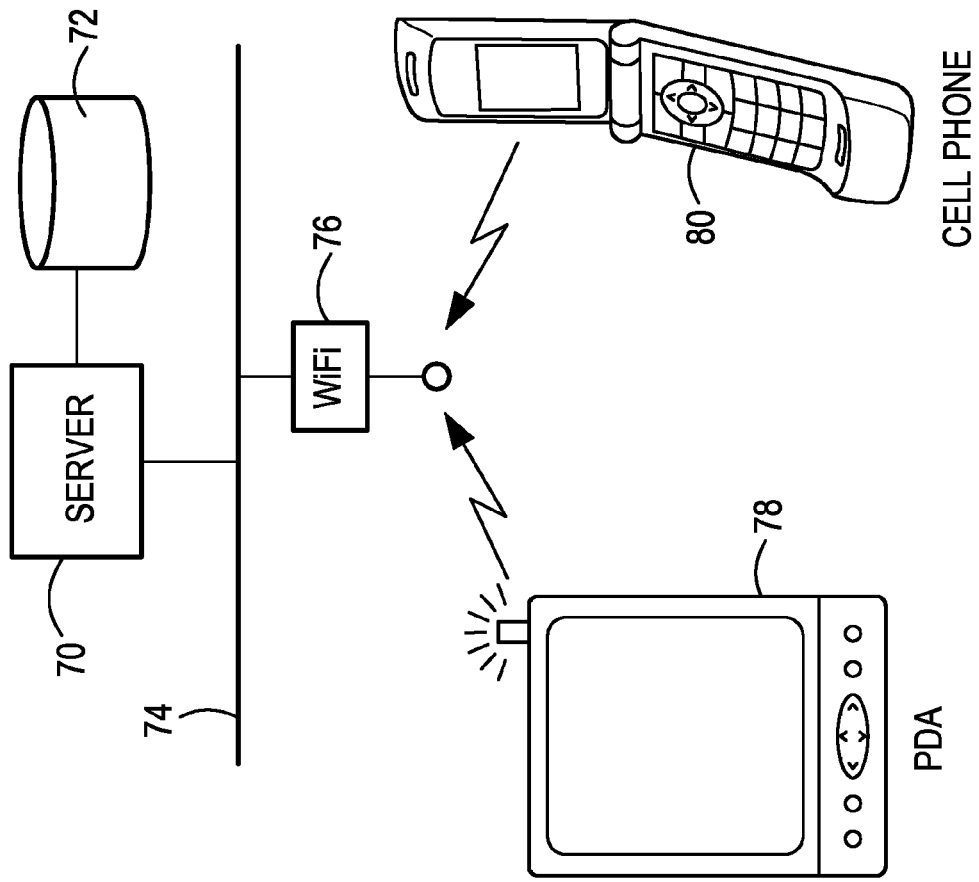
FIG. 5 illustrates a first portable communication device communicating with a second portable communication device via a web site in accordance with one aspect of the present invention.

Referring to FIG. 5, another aspect of the present invention is illustrated. A server 70 having a database 72 is provided. The database 72 includes dossiers on a large number of people and the server 70 can access other databases stored on various servers on the internet 74. A wireless connection 76, such as a Wi-Fi connection, allows a first portable communication device 78 and a second portable communication device 80 to communicate with the server 70.

Each of the portable communication devices 78 and 80 include a GPS device, and they transmit the identity of the owner of the device and the present location of the devices 78 and 80 to the server 70. Thus, the server 70 knows that portable communication devices 78 and 80 are co-located at a particular time, say at a party. The server 70 can therefore provide information about the other people at the party to one of the individuals. For example, if the individual owning portable communication device 80 wants to find out information about the other people at the party, the server 70 could provide that information. For example, the server 70 could provide information about the a person's net worth, line of credit, what kind of car they drive, etc. Also, a person could find out what drugs (and diseases) a potential date may have by accessing their recent purchases of prescriptions (which unlike medical treatment is not privatized).

It is also possible to transmit the offers for goods and services previously described, as well as other offers, to navigational devices in cars. This can be done by a wireless communication channel in the navigational system. It can also be done by jamming the communication receiver on the navigational system.

While there has been shown a preferred embodiment of network for targeting individual operating a microcomputer regardless of his location in accordance with the invention, it will be appreciated that many changes and modifications may be made therein without, however, departing from the essential spirit thereof.

What is claimed is:

1. A computer-implemented method for communicating an offer of goods or services to an individual having a microcomputer wirelessly linked to the internet and provided with a GPS receiver, the method comprising:

receiving over the internet, from the microcomputer, location information derived from the GPS receiver and information identifying the individual;

using the location information and the identifying information in a programmed computer in communication with a data bank of goods and services and a data bank of consumer profiles to determine an appropriate offer of goods or services for the individual; and thereupon, under the control of the programmed computer and without specific request by the individual, sending to the microcomputer over the internet using an identifier unique to the individual a message communicating the offer.

2. A method according to claim 1, wherein the programmed computer is a server.

3. A method according to claim 1, further comprising:
connecting a provider of goods and services to the data bank of goods and services; and
updating the data bank through the provider.

4. A method according to claim 1, wherein the microcomputer is any portable computer that can be carried to a desired site and operated at that site.

5. A method according to claim 4, wherein the microcomputer is a lap-top computer.

6. A method according to claim 1, wherein the microcomputer is a cell phone.

7. A method according to claim 1, wherein the microcomputer is a PDA.

8. A method according to claim 1, wherein the microcomputer is a navigation system in an automobile.

9. A method according to claim 1, wherein the microcomputer is a portable computer with e-mail capability using a Blackberry protocol.

10. A method according to claim 1, wherein the offer includes a discounted price.

11. A computer-implemented. method for communicating an offer of goods or services to an individual having a microcomputer wirelessly linked to the internet and provided with a GPS receiver, the method comprising:

sending over the internet, from the microcomputer, location information derived from the GPS receiver and information identifying the individual; and receiving over the internet without specific request by the individual, at the microcomputer, via a unique identifier for the individual, an appropriate offer of goods or services for the individual determined by and thereupon sent under control of a programmed computer in communication with a data bank of goods or services and a data bank of consumer profiles based on the location information and the identifying information.

12. A method according to claim 11, further comprising:
receiving, from the individual, a desired category of goods and services;
comparing the desired category with the offer of goods and services; and
displaying the offer of goods and services if the desired category matches the offer.

13. A method according to claim 11, wherein the programmed computer is a server.

14. A method according to claim 11, wherein the microcomputer is any portable computer that can be carried to a desired site and operated at that site.

15. A method according to claim 14, wherein the microcomputer is a lap-top computer.

16. A method according to claim 11, wherein the microcomputer is a cell phone.

17. A method according to claim 11, wherein the microcomputer is a PDA.

18. A method according to claim 11, wherein the microcomputer is a navigation system in an automobile.

19. A method according to claim 11, wherein the microcomputer is a portable computer with e-mail capability using a Blackberry protocol.

20. A method according to claim 11, wherein the offer includes a discounted price.

* * * * *